(12) United States Patent
Rhoe (10) Patent No.: US 8,886,473 B1
(45) Date of Patent: Nov. 11, 2014

(54) SYSTEM AND METHOD FOR VIBRATION ANALYSIS

(76) Inventor: Ray W. Rhoe, New Harmony, UT (US)

( * ) Notice: Subject to any disclaimer, the term of this patent is extended or adjusted under 35 U.S.C. 154(b) by 180 days.

(21) Appl. No.: 12/112,893

(22) Filed: Apr. 30, 2008

Related U.S. Application Data

(60) Provisional application No. 60/914,781, filed on Apr. 30, 2007.

(51) Int. Cl.
*G01F 17/00* (2006.01)
*G01H 17/00* (2006.01)
*G06F 17/00* (2006.01)

(52) U.S. Cl.
CPC ................ *G01H 17/00* (2013.01); *G06F 17/00* (2013.01)

USPC .......................................................... 702/56

(58) Field of Classification Search
None
See application file for complete search history.

(56) References Cited

U.S. PATENT DOCUMENTS 6,484,109 B1 * 11/2002 Lofall .............................. 702/56

* cited by examiner

*Primary Examiner* — Aditya Bhat
(74) *Attorney, Agent, or Firm* — Jones Waldo Holbrook & McDonough, PC (57) ABSTRACT

Identification and correction of component vibration issues in an industrial plant is accomplished with a database of component vibration data collected and maintained on a plant server, secure access to the database through the Internet, and three levels of periodic vibration analysis.

4 Claims, 7 Drawing Sheets

SYSTEM INITIALIZATION

SYSTEM AND METHOD FOR VIBRATION ANALYSIS

CROSS-REFERENCES TO RELATED APPLICATIONS

This application claims priority to U.S. Provisional Patent Application No. 60/914,781, filed Apr. 30, 2007.

INCORPORATION-BY-REFERENCE OF MATERIAL SUBMITTED ON A COMPACT DISC

Not Applicable.

STATEMENT REGARDING FEDERALLY SPONSORED RESEARCH OR DEVELOPMENT

Not Applicable.

BACKGROUND OF THE INVENTION

1. Field of Invention

This invention relates to all general industry that utilizes rotating components as process equipment.

More particularly, the invention relates to analysis of vibration data from and related to rotating equipment, such as but not limited to pumps, motors, fans, gearboxes, generators and turbines, in industrial plants and other applications such as but not limited to the fields of power generation, chemical processing, mining, marine and naval applications, water and waste water processing plants, and oil refineries.

2. Background Art

Monitoring and analysis of component vibration levels is in integral part of normal operations in many areas of industry. Such monitoring and analysis enables early detection of component vibration issues that may lead to component failure or other undesirable operational conditions, thereby enabling corrective action prior to such component failure or occurrence of such conditions, and in a manner that supports scheduled repairs.

The current industry-wide method for analyzing machinery vibration data is inefficient and expensive.

Major industrial plants employ a vibration analyst to implement an in-house vibration monitoring and analysis program. The training, knowledge and experience of vibration analysts can vary widely within the industry, thus the level of skill varies widely throughout the industry.

The salary for an entry-level vibration analyst is approximately $60,000 per year, or $5,000 per month. With employee benefits and training, the cost for this one employee can increase to well over $6,000 per month. The cost to employ a Category IV Analyst can be double to triple or more than the entry-level analyst. Thus, the investment can be substantial, yet the quality of the programs can vary widely between plants.

SUMMARY OF THE INVENTION

One important objective of the invention is to provide a new and unique system and method for analyzing general industry or plant vibration data that is superior in analytical quality and effectivity as compared with the typical in-plant vibration analysis program, and thereby enhance equipment reliability and reduce the cost of operating the plant.

Another important objective of the invention is to provide a new and unique system and method for analyzing vibration data that is superior in redundancy as compared with the typical in-plant vibration analysis program, and thereby further enhance equipment reliability and further reduce cost of operating the industrial plant.

The system and method for industrial plant vibration analysis according to the invention achieves significant advantages and benefits as compared with the typical in-plant vibration analysis program. The principle advantages and benefits achieved include significantly reducing vibration analysis costs while improving equipment reliability.

The invention eliminates the need to employ a vibration analyst, and therefore, eliminates related employee problems and costs, such as plant personnel turnover, sick leave, vacation, interview and selection, orientation and in-plant training. The invention also eliminates the additional costs and operational inconveniences related to the inexperienced entry-level vibration analysts and off-site training for the analyst, including travel expenses, lost employment time, and training classes and annual re-certification costs.

The invention provides that a Certified Category-IV Analyst will review the data for all component vibration issues. There are less than 100 Certified Category-IV Analysts worldwide, and this is the highest level of certification available. Thus, it is not possible for every major industrial plant in the world to employee a Category-IV Analyst. But by having all data reviewed by a Category-IV Analyst, in accordance with the invention, each plant is assured of the highest level of data analysis possible.

These and other objectives and advantages of the invention will become more apparent from the following detailed description when taken in conjunction with the accompanying drawings.

The invention provides a system and method that utilizes a communication link, preferably of a worldwide communication system, and an off-site expert system, comprising a team of off-site vibration analysts with consistent knowledge, training and experience communicating with the plant and its machinery vibration data and associated potential problems. The invention achieves its objectives through, among other things, independent review of vibration data by industry vibration experts with increasing experience and internal peer checks. In this way, the invention can be consistently implemented for any plant throughout the world.

The objectives, advantages and implementations of the invention are accomplished at a fraction of the cost of employing a single entry-level analyst. Thus, the invention achieves a substantial savings to the operation of any plant.

In accordance with one aspect of the invention, a system and method is provided that utilizes three levels of off-site certified vibration analysis with increasing vibration analytical training and experience, wherein each level analyzes all industrial plant vibration data after the preceding level (the level with less or one-step down training and experience). The levels are industry specified Category-II, Category-III and Category-IV Analysts, with each level having increasing training and experience, and the last of which there are less than 100 worldwide. Thus, the invention provides the highest level of vibration analysis (Category-IV) for all plants throughout the world, which would not be possible through the current practice of analyst employment at each plant.

In accordance with another aspect of the invention, a system and method is provided that utilizes five off-site certified vibration analysts, comprising two Category-II Analysts, two Category-III Analysts, and one Category-IV Analyst, with multiple level peer checking, i.e., peer checking at the Category-II and Category-III levels.

The invention preferably uses the Internet communication system linking industrial plants to off-site analyst computing stations. Vibration data from industrial plants located all over the world can accessed from the analyst computing station using the Internet and a secure server that holds the data. This eliminates travel expenses and the vibration data on the server can be analyzed immediately (in real-time) as it is collected, if conditions of the component issue advise. Current advanced computer technology permits secure data access and analysis through the Internet by use of a CITRIX server, a SecurID card, and read-only access to the database on the server. The CITRIX server (Citrix Systems, Inc., Fort Lauderdale, Fla.) and SecurID card (RSA Security, Inc., Bedford, Mass.) are commercially available brand products. The SecurID card provides secure access to a database via the Internet through use of both a random password and a personal identification number. Those skilled in the art will appreciate that computer and communication technologies will advance, that server and secure access technology will accordingly change, and that the invention is not limited to the specific technologies or brands described herein.

An early step in the invention is to have a Certified Category-IV Analyst review the entire database of previously collected component vibration data for the plant. This is done to establish a data baseline, and identify any previously unknown component issues. The Category-IV Analyst is the highest level of achievement recognized by the vibration industry. There are less than 100 Category-IV Analysts worldwide. If any issues are found, the Category-IV Analyst notifies the appropriate plant personnel, provides recommendations for corrective action, and provides technical support to maintenance personnel at the plant to ensure all issues are properly addressed.

Another early step in the invention involves a visit by a Category-IV Analyst, and preferably a Category-IV, III and II Analyst to the plant, to provide on-site data collector training to plant personnel through use of a step-by-step manual, verify all data collection points are marked and in the best locations on the relevant components, collect digital images of all relevant components to support future off-site troubleshooting, and address additional component issues with plant personnel as may be identified during the on-site visit.

Every month thereafter (or at convenient, regularly scheduled intervals), two Certified Category-II Analysts independently review all new vibration data collected during the preceding month. The Category-II Analysts look for and document (e.g., in written reports) component vibrational characteristics such as step changes in component vibration levels, trends of increasing component vibration, and new component vibration frequencies in the vibration data. The Category-II Analysts then peer check each other's work to verify a thorough review has been performed. The Category-II Analysts forward their results to two Category-III Analysts for a more detailed review and analysis of the vibration data. At this point, two qualified Analysts have reviewed all new monthly data and provided a peer check to ensure quality results.

The two Category-III Analysts independently review all new component issues identified by the Category-II Analysts. The Category-III Analysts perform a more advanced review of the suspect data, identify the cause of all problems, and document their findings and results. The Category-III Analysts also peer check each other's work to verify a thorough review has been performed, and provide corrective recommendations to maintenance personnel at the plant. The Category-III Analysts forward their results to the Category-IV Analyst for final approval, and the highest level of certified data analysis possible. The Category-III Analysts also go back and review all new monthly data as a peer check of all new data. At this point, four industry analysts have reviewed all new data, on two levels of analysis, and this includes multiple peer checks of the results.

The Category-IV Analyst performs a high-level review of all component issues previously identified by the other analysts. The Category-IV Analyst ensures that the analysis and corrective recommendations are complete and accurate, and determines if any additional data should be collected to troubleshoot the problem. The Category-IV Analyst notifies the customer of all new issues, requests additional data collection as previously determined, and provides additional recommendations for corrective action and technical support as needed by the maintenance personnel at the plant. The Category-IV Analyst also reviews all new vibration data as a further check to insure that the Category-II and Category-III Analysts did not miss anything relevant during their previous reviews. At this point, five Certified Vibration Analysts have reviewed all new component vibration data, on three levels of analysis, and provided multiple peer checks. The Category-IV Analyst finalizes and forwards a monthly report to the customer.

Every month thereafter, a review of new vibration data collected during the preceding month is conducted, beginning with the Category-II Analysts, proceeding next with the Category-III Analysts, and ending with the Category-IV Analyst, thereby assuring the plant of the highest level of certified data analysis possible without the expense of employing a Category-IV Analyst, and at less cost than employing a Category-II Analyst.

In general, the invention involves system setup, system initialization, and system maintenance through periodic review involving a continuous looping through a repeating process.

System setup, to implement operation on the plant side, involves providing or transferring the vibration database to a secure computer-server such as running a CITRIX brand software-server connected to the Internet; and providing secure read-only access to the database on the server, such as by providing a SecurID card to each analysts and corresponding functionality. Thereafter, operation of the invention is transparent with regard to all other plant operations, except as component issues may be identified.

On the analysts' side, computers are provided with connections to the Internet, and browser-based client software (or other applicable client software applicable to the specific communications link utilized) to access the vibration data on the plant server through the secure access functionality.

Vibration analytical software, with known or applicable analytical algorithm functionality, retrieves and accepts vibration data input from the server and provides the vibrational analytical output at the off-site analyst's station—from which suspect component issues (e.g., components with potential concerns due to vibration conditions) can be identified the analyst. Current commercially available software includes MasterTrend, RBMware, VibeView brand software for use in vibrational analysis, which will either be installed on the analysts' computers, or preferably, on the plant server for remote access to and use by the analysts at the remote expert station.

As used herein, the terms computers (or computing stations), server, and the like, are used in their commonly understood meaning in the art, and include all of the conventional hardware and software components (e.g., central processing units, hard drives, random access memory, graphics cards and subsystems, input and output devices such as monitors, keyboards, mice and communications ports, operating systems, and user interface generating software) in conventional operative connection and corresponding functionality. Accordingly, as used herein, it will be understood that the term server generally refers to the computer and accompanying software that holds and delivers vibration data to the computing stations via the Internet in response to requests from the client software on the computing stations, although, at times, reference to a server may also be understood as reference to the corresponding computer or, alternately, the corresponding software.

Due to the proprietary and critical nature of industrial plant vibration data, and possible catastrophic ramifications should secure access be compromised by an unauthorized party, the invention is preferably implemented with the most advanced computer hardware and software technology then currently available, and is upgraded as applicable advances are achieved in the technology, as well as the READ-ONLY access to the industrial plant's database.

Following system setup, system initialization is accomplished with Category-IV initial review, analysis, corrective action, etc., discussed above and in further detail below.

After initialization, system maintenance involves periodic (e.g., monthly) review of all new vibration data collected during the preceding time period, utilizing multiple levels of vibration analysis, i.e., Category-II, Category-III and Category-IV level analysis described above and in additional detail below.

While the invention is susceptible to various modifications and alternative constructions, a certain illustrated embodiment has been shown in the drawings and will be described below in detail. It should be understood, however, that there is no intention to limit the invention to this specific form, but on the contrary, the intention is to cover all modifications, alternative constructions, methods and equivalents falling within the spirit and scope of the invention.

DETAILED DESCRIPTION OF THE INVENTION

Overview—

Figure 1:
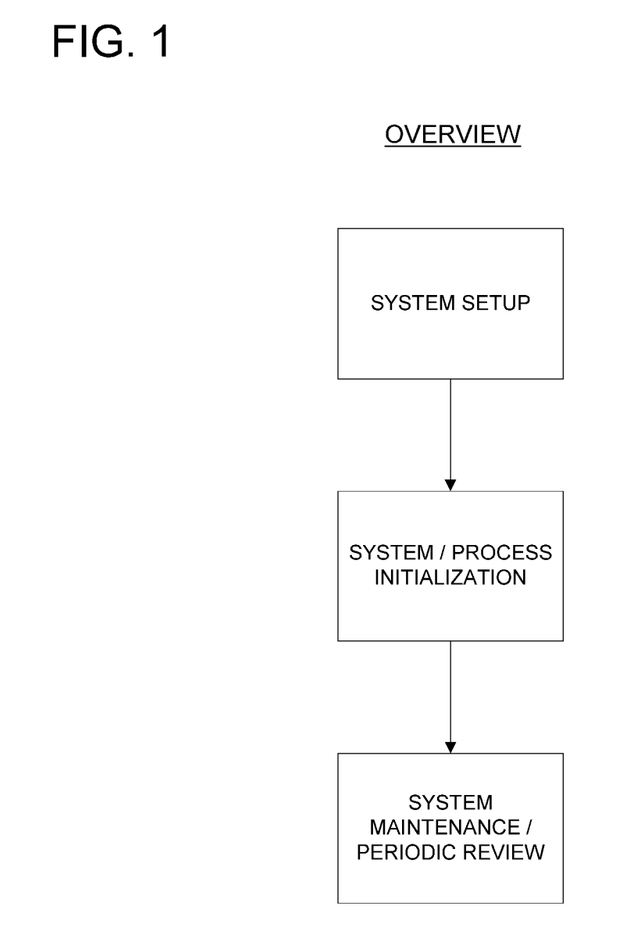
FIG. 1 is a diagram illustrating certain overall aspects of a preferred embodiment system and method in accordance with the invention.

Referring more specifically to the drawings, FIG. 1 is a diagram illustrating certain overall aspects of a preferred embodiment system and method in accordance with the invention. The invention involves (a) system setup; (b) system initialization; and (c) system maintenance through periodic review (including a continuous looping through a repeating process).

System Setup—

Figure 2:
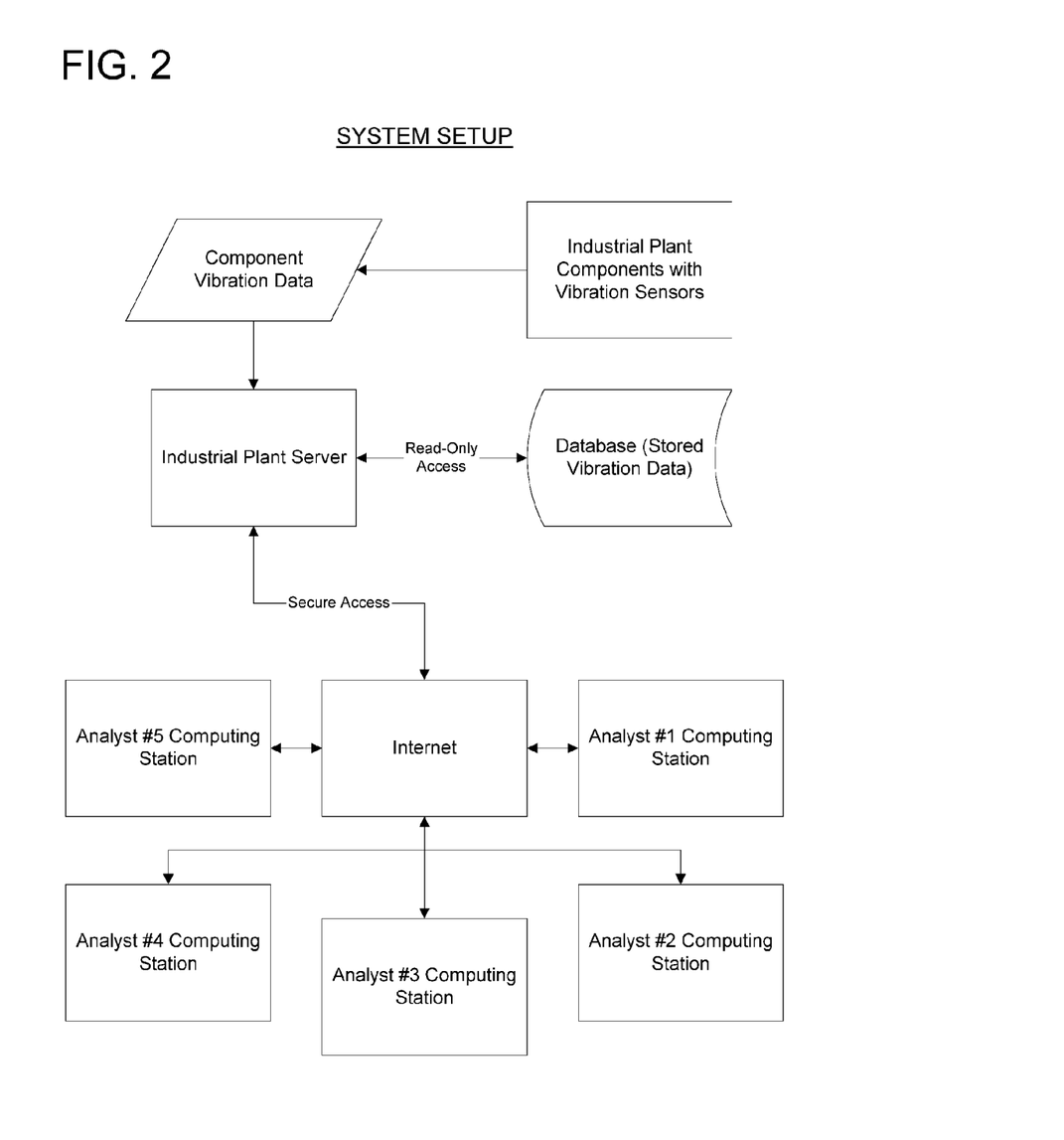
FIG. 2 is a diagram illustrating certain aspects of the system setup identified in FIG. 1.

FIG. 2 is a diagram illustrating certain aspects of the system setup identified in FIG. 1.

As discussed in further detail below, the invention is implemented through the Internet communication system, linking a plant computer (server) to an off-site expert analytic station comprising PC type computers at Analyst computing stations.

The plant can be any general industrial or other plant or operation utilizing rotating process equipment such as motors, fans, gearboxes, pumps, generators and turbines, as for example, a nuclear-powered electric generating power plant. The plant personnel attach vibration sensors to appropriate locations on components or machinery of interest in the plant. The sensors transmit component vibration data in the form an electronic signal that is conditioned and processed as applicable, and collected and digitally stored in one of more databases on hard drive(s) of a plant computer.

The plant server is connected to the Internet for secure access from the computing stations. The server includes computer hardware and/or accompanying software that holds and delivers vibration data to the computing stations via the Internet in response to requests from the client software on the computing stations. The server is a conventional server, equipped with conventional components such as a central processing unit, hard drives, random access memory, applicable subsystems, communications ports and software in conventional operative connection and corresponding functionality. Although only one plant server is shown in the drawings, the invention contemplates multiple servers from corresponding plants worldwide, with corresponding vibration data, connected to the Internet for secure, read-only access from the computing stations. Thus, implementation on the plant side involves providing or transferring the vibration database to a secure server connected to the Internet; and providing secure read-only access to the database on the server. Current preferred embodiment of the invention involves provision of a CITRIX brand software server and a SecurID card for secure read-only access to the database on the server. The vibration analytical software, such as Master-Trend, RBMware, VibeView brand software, will also typically be installed on the plant server and accessible at the remote analysts' stations via the Internet communication link.

Off-site computers (PCs), specified as analysts' computing stations #1-5, are also provided with connections to the Internet; software to access the vibration data and vibration analytical software through the secure access functionality for use in vibrational analysis. The off-site computers are equipped with conventional components such as central processing units, hard drives, random access memory, graphics cards and subsystems, and input and output devices such as monitors, keyboards, mice and Internet communications ports in conventional operative connection and corresponding functionality. The secure access software enables entry of the random password associated with the SecurID card, and a personal identification number of the analyst using that computing station.

System Initialization & System Maintenance—

Figure 3:
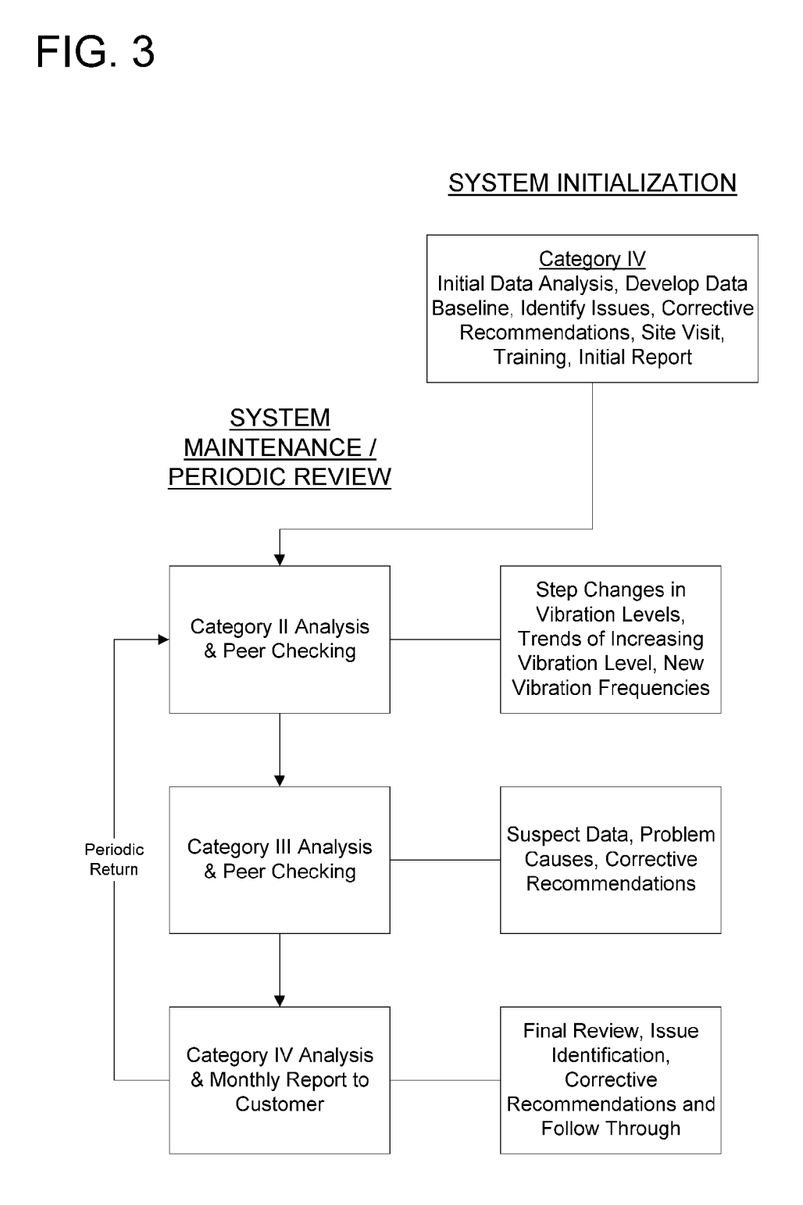
FIG. 3 is a diagram illustrating certain aspects of the system initialization and system maintenance with periodic review identified in FIG. 1.

FIG. 3 is a diagram illustrating an overview of system initialization and system maintenance with periodic review identified in FIG. 1.

System initialization is accomplished after system setup, with a Category-IV initial review and analysis of the entire database of previously collected component vibration data for the industrial plant, to establish a data baseline, identify any previously unknown component issues, notify plant personnel and provide recommended corrective action(s) for such previously unknown component issue, and follow-up to make sure corrective action is implemented at the plant and that such corrective action solved the component issue.

System initialization further involves a visit to the industrial plant to provide standardized on-site training on data collection procedures to industrial plant personnel (such as through use of a step-by-step manual) as required, verify all data collection points are marked and in the best locations on the relevant components, collect digital images of all relevant components to support future off-site troubleshooting, and address additional component issues with plant personnel as may be identified during the on-site visit.

System maintenance is accomplished after system initialization, with a periodic (e.g., monthly) review of all new vibration data developed during the preceding time period utilizing Category-II level vibration analysis, then Category-III level vibration analysis, and finally Category-IV level vibration analysis.

The Category-II analysis involves two independent analyses to investigate and report on component vibrational characteristics such as step changes in component vibration levels, trends of increasing component vibration, and new component vibration frequencies in the vibration data. Each Category-II analysis also involves peer checking the analytical results of the other.

The Category-III analysis involves two independent analyses to investigate suspect vibration data (indicating a potential component problem) identified during the Category-II analysis, identify the cause of such problem(s), and provide recommendations for actions to be taken by plant personnel to correct the potential problem. Each Category-III analysis also involves peer checking the analytical results of the other, and an independent review of all new vibration data.

The Category-IV analysis involves review of the preceding Category-II and Category-III analyses, and follow-up with plant personnel concerning potential issues and implementation and effectiveness of corrective actions. The Category-IV analysis also involves providing a monthly report to the plant customer on the results of that month's work at all analytical levels.

The process returns to the Category-II analysis every month, and proceeds through the Category-III and Category-IV analysis.

System Initialization—

Figure 4:
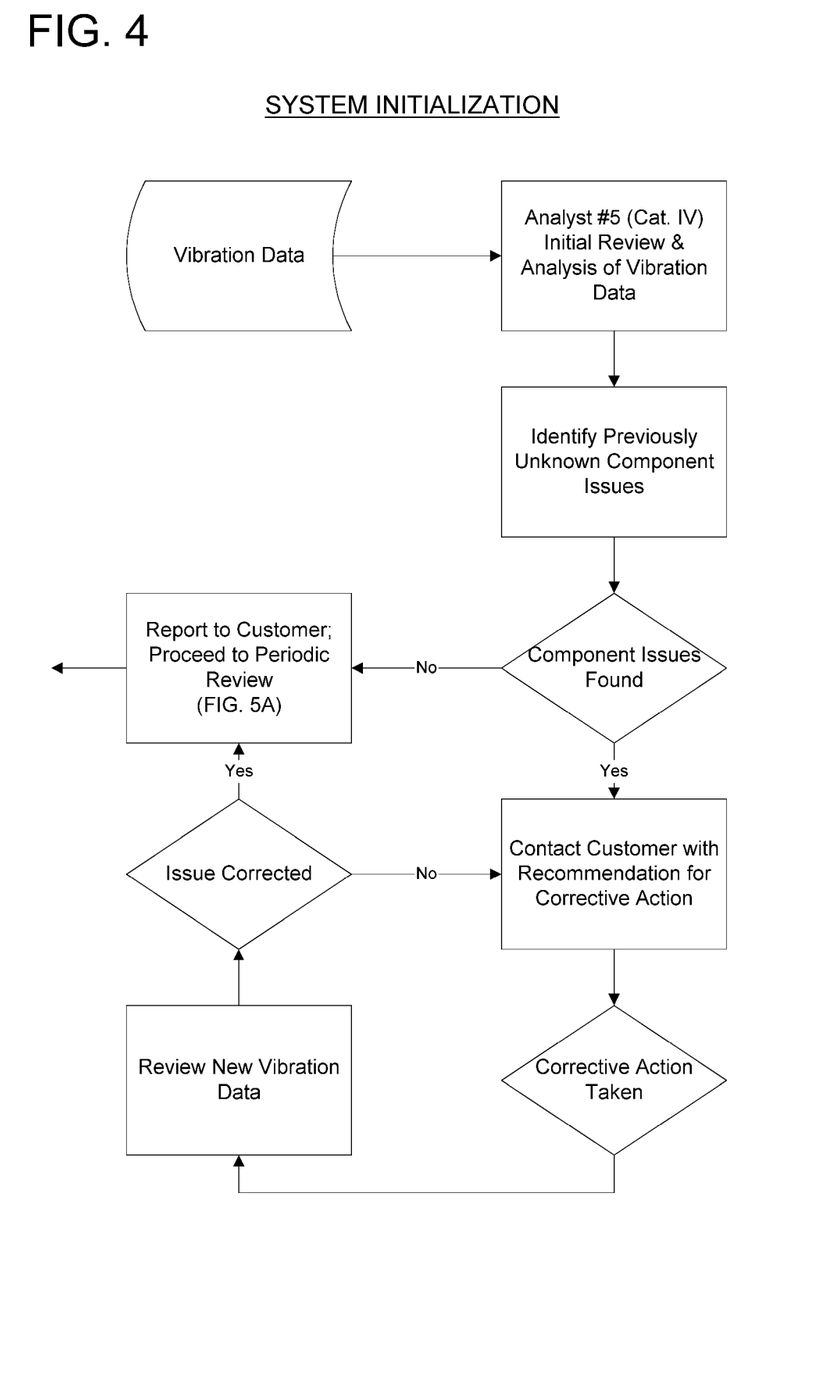
FIG. 4 is a diagram illustrating certain additional aspects of the process initialization identified in FIGS. 1 and 3.

FIG. 4 is a diagram illustrating certain additional aspects of the process initialization identified in FIGS. 1 and 3.

Analyst #5 computing station connects to the Internet, accesses the industrial plant server by secure access described above utilizing browser-based software. Once a communication link is established between the computing station and the server, Analyst #5 can accesses and operate the vibration analytical software (such as described above) and cooperatively access the vibration data (both of which are stored on the server hard drive) from the computing station as if the computing station were part of a secure computer network inside the industrial plant, but with read-only access to the data.

An initial review and analysis of the vibration data (the entire database of previously collected component vibration data for the industrial plant, or at least that portion of the data as relevant to current component conditions) is then completed. The analytical software, loaded into memory, pulls the data from the harddrive and loads the data into memory, all in a conventional manner, as instructed accordingly from Analyst #5 computing station, utilizing signals transmitted through the established communication link, the analytic software manipulates the data with its preprogrammed algorithms in order for Analyst #5 to obtain a data baseline, determine if any degrading trend is observed in the vibration data, and detect any previously unknown component issues.

If no previously unidentified component issues are found during the Analyst's initial review, then an initial report is developed and delivered to the plant customer, and the process proceeds to the system maintenance with periodic review.

If a previously unidentified component issue is found during the initial review, then the appropriate plant personnel are notified of the issue, and corresponding corrective action is recommended to the plant personnel by Analyst #5. After the corrective action has been completed, vibration data for the suspect component is collected and reviewed to verify that the potential issue has been corrected. (i.e., follow-up to make sure corrective action is implemented at the industrial plant and that such corrective action solved the component issue). If the component vibration issue has been corrected, then the initial report is developed and delivered to the customer, and the process proceeds to the system maintenance with periodic review. If the component vibration issue has not been corrected, then processing returns to recommendation for corrective action, corrective action taken, and subsequent vibration data review until the component vibration issue is corrected. Thereafter, the initial report is developed and delivered to the customer, and the process proceeds to the system maintenance with periodic review.

System Maintenance with Periodic Review, Category II Analysts—

Figure 5A:
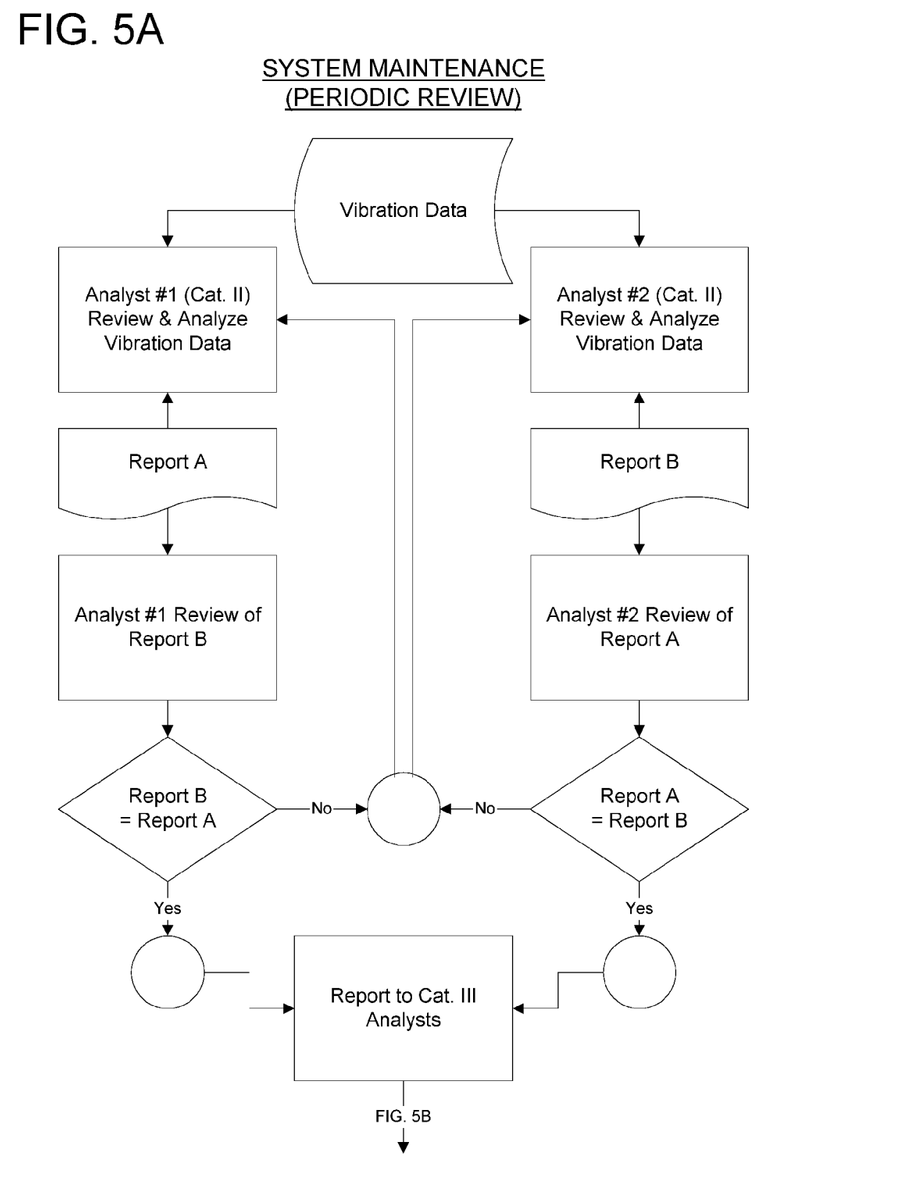
FIGS. 5A-C are diagrams illustrating certain additional aspects of the system maintenance and periodic review identified in FIGS. 1 and 3.

FIG. 5A is a diagram illustrating certain additional aspects of the system maintenance with periodic review, primarily with respect to Category-II analysis.

The principle purpose of the Category-II Analyst is periodic investigation and identification of changes or anomalies in the vibration data that may indicate a change in component structure or integrity. Category-III and Category-IV Analysts are qualified for and could alternately undertake this fundamental data review, but this review is very detailed and time consuming, and is therefore most cost effectively accomplished by the Category-II Analyst. In carrying out the preferred embodiments of the invention, and as discussed further below, both the Category-III and Category-IV Analysts also review the vibration data each month, but this review is only a check on the initial in-depth review, to making sure that nothing was missed during the Category-II analysis, and therefore can typically be accomplished in less time than the initial thorough review of the data.

Category-II Analysts' Vibration Data Periodic Review— Analyst #1 Computing Station:

Approximately one month after completion of system initialization (and every month thereafter), Analyst #1 computing station connects to the Internet, accesses the industrial plant server by secure access described above utilizing browser-based software. Once a communication link is established between the computing station and the server, Analyst #1 can access and operate the vibration analytical software and cooperatively access the vibration data from the computing station as if the computing station were part of a secure computer network inside the industrial plant, but with read-only access to the data.

An in-depth review and analysis of the vibration data collected during the preceding month (or the preceding interval or following system initialization) is then completed. The analytical software, loaded into memory, pulls the data from the harddrive and loads the data into memory, all in a conventional manner, as instructed accordingly from Analyst #1 computing station, utilizing signals transmitted through the established communication link, the analytic software manipulates the data with its preprogrammed algorithms in order for Analyst #1 to identify component vibrational characteristics such as step changes in component vibration levels, trends of increasing component vibration, and new component vibration frequencies in the vibration data. The above component vibrational characteristics, if identified, are documented in a written Report A. Those skilled in the art will appreciate that Analyst #1 work involves additional detailed steps in accomplishing the CPU-based processing, that Analyst #1 takes further steps as applicable to accomplish same.

Category-II Analysts' Vibration Data Periodic Review—Analyst #2 Computing Station:

Approximately one month after completion of system initialization (and every month thereafter), Analyst #2 computing station undertakes the same steps as Analyst #1, but independently of Analyst #1, to identify the above-noted component vibrational characteristics, and if identified, document same in a written Report B.

Category-II Analysts' Vibration Data Review—Peer Checking:

Upon completion of the vibration data review, Analyst #1 transmits Report A to Analyst #2, and Analyst #2 transmits Report B to Analyst #1. The component vibrational characteristics identified in Report A are compared with the component vibrational characteristics identified in Report B by both Analyst #1 and #2. If the same component vibrational characteristics are identified in Report A and Report B, then the reports are sent to the Category-III Analysts such as via the Internet. If the same component vibrational characteristics are not identified in Report B and Report A, then communication is undertaken between Analysts #1 & #2, the source of or reason for the discrepancy between the reports is determined, the applicable report(s) corrected, and the finalized report(s) sent to the Category-III Analysts.

If the same component vibrational characteristics are not identified in Report B and Report A, and agreement cannot be reached between Analysts #1 & #2 as to correction of the reports (i.e., the Analysts cannot agree with regard to the relevant component vibrational characteristics) within a timely manner (e.g., 24 hours, or in view of the potential condition involved in the vibration data anomaly or discrepancy), then both reports are sent to the Category-III Analysts for resolution of the difference(s) between the reports.

System Maintenance with Periodic Review, Category III Analysts—

Figure 5B:
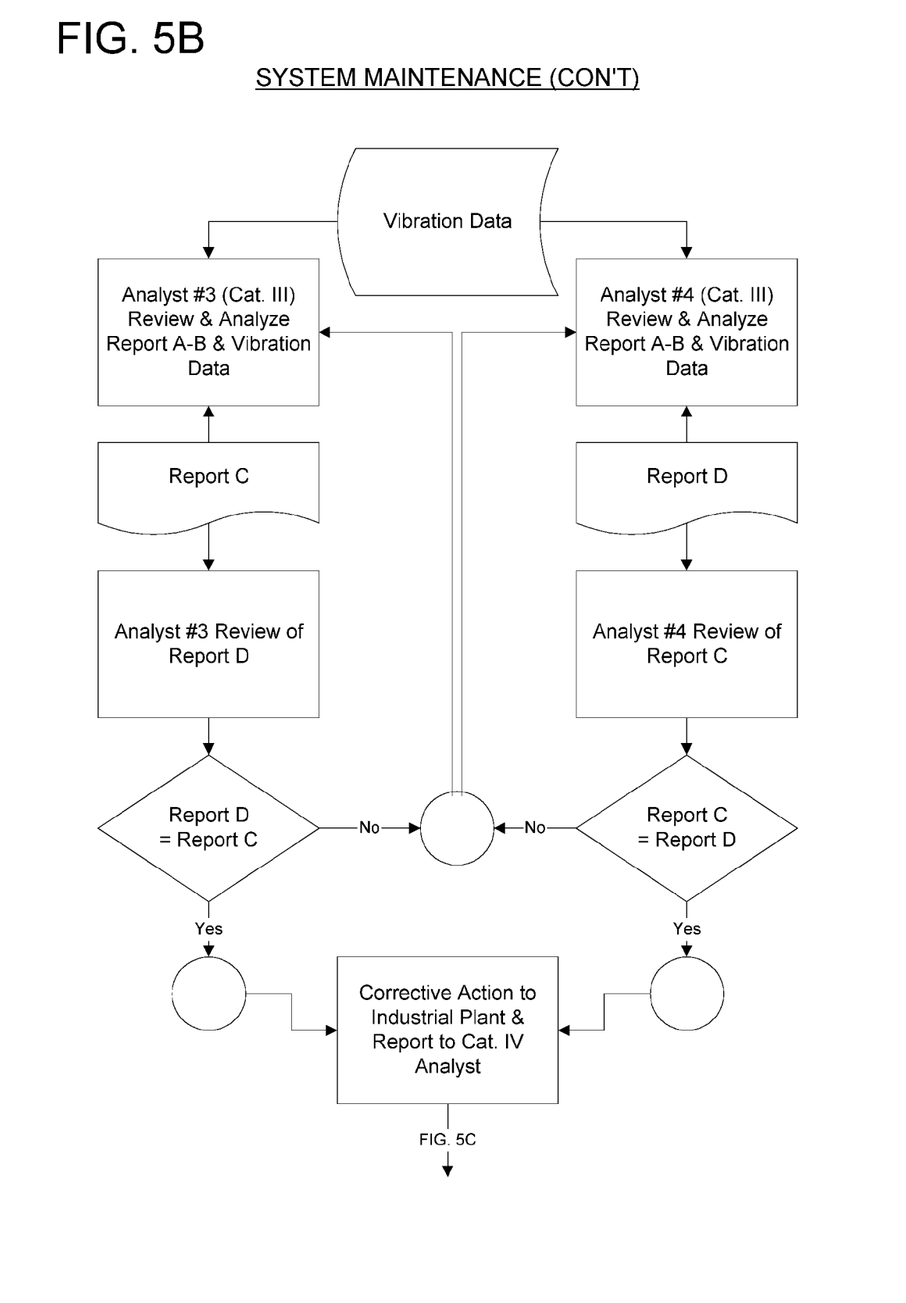

FIG. 5B is diagram illustrating certain additional aspects of the system maintenance with periodic review, primarily with respect to Category-III analysis.

The principle purposes of the Category-III Analyst are to complete a more detailed periodic review and analysis of suspect data vibration data (i.e., the component vibrational characteristics noted above) and independently review corresponding component issues, as identified and reported by the Category-II Analysts, and provide recommendations to maintenance personnel at the plant for corrective actions in order to stop or cure the vibration anomalies.

Category-III Analysts' Vibration Data Periodic Review—Analyst #3 Computing Station:

Upon receipt of the monthly report(s) from Category-II analysis, Analyst #3 reviews and analyzes the component vibrational characteristics and corresponding component issues noted in the report(s). Analyst #3 computing station also connects to the Internet, accesses the industrial plant server by secure access described above utilizing browser-based software. Once a communication link is established between the computing station and the server, Analyst #3 can access and operate the vibration analytical software and cooperatively access the vibration data from the computing station as if the computing station were part of a secure computer network inside the industrial plant, but with read-only access to the data. During the Analyst #3 process, the analytical software is loaded into memory, pulls the vibration data collected during the preceding month (as well as any other desired previously collected vibration data) from the harddrive and loads the data into memory, all in a conventional manner, as instructed accordingly from Analyst #3 computing station, utilizing signals transmitted through the established communication link. As further directed from instruction from Analyst #3 computing station, the analytic software manipulates the data utilizing its preprogrammed algorithms in order for Analyst #3 to independently confirm the component vibrational characteristics noted in the report(s) from the Category-II analysis.

From the results of the preceding Category-III analysis, preliminary corrective action recommendations (for maintenance personnel at the plant) are developed. The results from the Category-III analysis concerning component vibrational characteristics, corresponding component issues, if identified, and preliminary corrective action recommendations, are documented in a written Report C.

Category-III Analysts' Vibration Data Periodic Review—Analyst #4 Computing Station:

Upon receipt of the monthly report(s) from Category-II analysis, Analyst #4 computing station undertakes the same steps as Analyst #3, but independently of Analyst #3, to independently confirm the component vibrational characteristics noted in the report(s) from the Category-II analysis, develop preliminary corrective action recommendations, and document results in a written Report D.

Category-III Analysts' Vibration Data Review—Peer Checking:

Upon completion of initial Category-III analysis, Analyst #3 transmits Report C to Analyst #4, and Analyst #4 transmits Report D to Analyst #3. The component vibrational characteristics, corresponding component issues, and corresponding preliminary corrective action recommendations identified in Report C with the same in Report D by both Analyst #3 and #4. If the same component issues and corrective action recommendations are identified in Report C and Report D, then the reports are sent to the Category-IV Analyst such as via the Internet, and the corrective action recommendations are transmitted to the plant personnel. If the same component issues and corrective action recommendations are not identified in Report C and Report D, then communication is undertaken between the Analysts, the source of or reason for the discrepancy is determined, the applicable report(s) corrected, and the finalized reports sent to the Category-IV Analyst, and the corrective action recommendations are transmitted to the plant personnel.

If the same component issues and corrective action recommendations are not identified in Report C and Report D, and agreement cannot be reached between the Analysts as to correction of the reports (i.e., the Analysts cannot agree with regard to the relevant component issues and proper corrective action recommendations) within a timely manner (e.g., 24 hours, or in view of the potential condition involved in the vibration data anomaly or discrepancy), then the reports are sent to the Category-IV Analyst for resolution of the discrepancy prior to providing corrective action recommendations to the plant personnel.

System Maintenance with Periodic Review, Category IV Analyst—

Figure 5C:
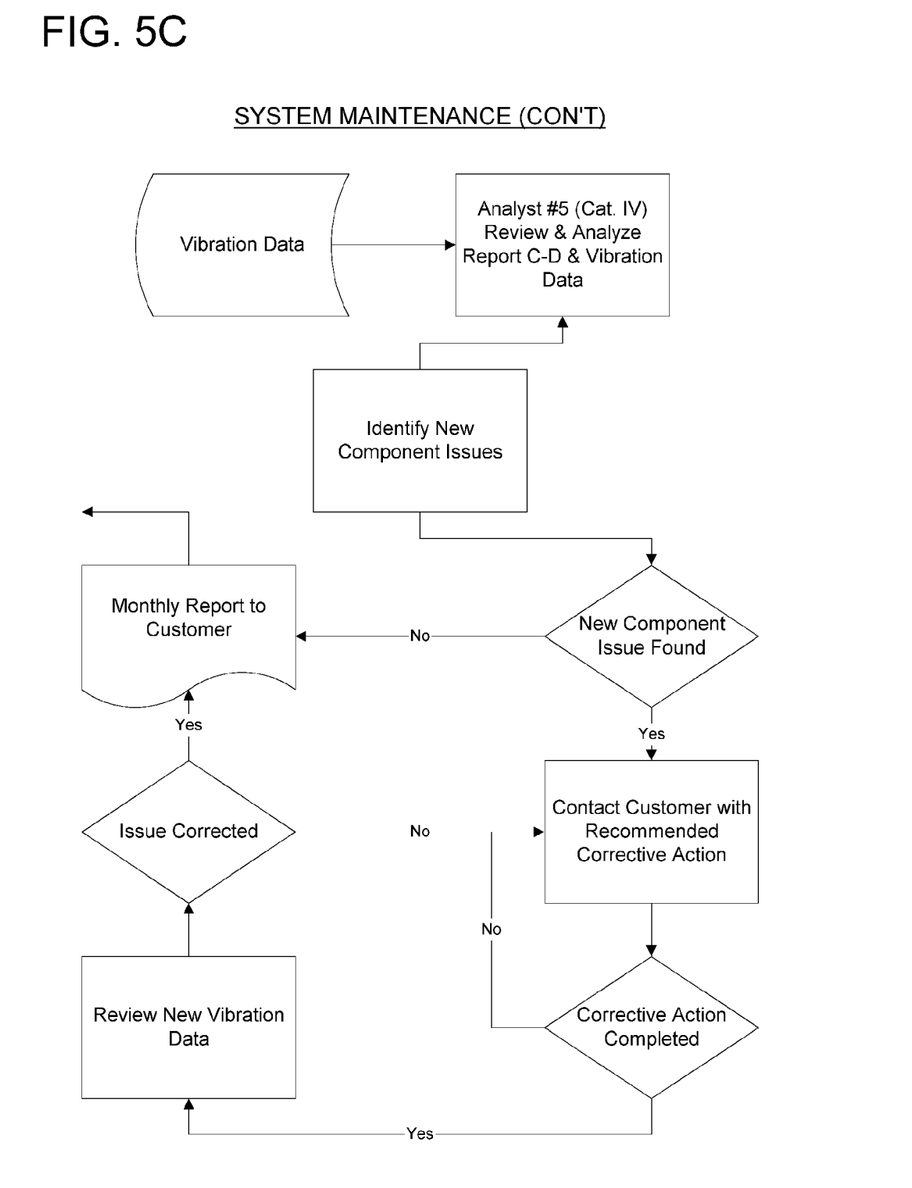

FIG. 5C is diagram illustrating certain additional aspects of the system maintenance with periodic review.

The principle purpose of the Category-IV Analyst is to perform a high-level review of the previous data analysis, to make sure the analysis of the Category-II and Category-III Analysts is complete and accurate, and make sure the component issues identified by and corrective recommendations made by the Category-III Analysts are correct. The Category-IV Analyst will also follow-up with plant personnel to make sure that corrective actions are implemented, that the corrective action has resolved the new component issue, determine if any additional data should be collected to troubleshoot a problem, and provide additional corrective action recommendations and technical support as needed by the plant personnel until all component issues are resolved.

Category-IV Analyst #5 Vibration Data Periodic Review—Analyst #5 Computing Station:

Upon receipt of the monthly report from Category-III analysis, Analyst #5 reviews and analyzes the component vibrational characteristics noted in the initial reports, and the component issues identified by and corrective action recommendations of the Category-III Analysts.

Analyst #5 computing station also connects to the Internet, accesses the industrial plant server by secure access described above utilizing browser-based software. Once a communication link is established between the computing station and the server, Analyst #5 can access and operate the vibration analytical software and cooperatively access the vibration data from the computing station as if the computing station were part of a secure computer network inside the industrial plant, but with read-only access to the data. During the Analyst #5 process, the analytical software is loaded into memory, pulls the vibration data collected during the preceding month (as well as any other desired previously collected vibration data) from the harddrive and loads the data into memory, all in a conventional manner, as instructed accordingly from Analyst #5 computing station, utilizing signals transmitted through the established communication link. As further directed from instruction from Analyst #5 computing station, the analytic software manipulates the data utilizing its preprogrammed algorithms in order for Analyst #5 to independently confirm the component vibrational characteristics, corresponding component issues and corrective action recommendations noted in the reports from the Category-II and Category-III Analysts.

If there are no new component issues that month, Analyst #5 generates and delivers a monthly report to the specified customer, such as the owner, operator or manager of the plant.

If component issues were identified during that monthly review, Analyst #5 follows up with the plant to confirm corrective action has been implemented per recommendations from Category-III Analysts, and as applicable, request additional information or provide addition corrective action recommendations until the component issue is resolved. When corrective action has been completed, Analyst #5 will access the vibration database as described above, and review new vibration data (data generated after completion of recommended correction action) relevant to the component issue. If analysis of new vibration data indicates that remedial action has corrected the component issue, then Analyst #5 will generate and deliver the monthly report to the customer. If analysis of new vibration data indicates that remedial action has not corrected the component issue, then Analyst #5 will provide additional corrective action recommendations, and repeat analysis of subsequent new vibration data until remedial action has corrected the component issue, and thereafter generate and deliver the monthly report to the customer.

As previously noted, those skilled in the art will recognize that the invention may be implemented in alternate embodiments, such as, for example, providing and utilizing an expert station with a three-member review team consisting of one Category II Analyst, one Category III Analyst and one Category IV Analyst, twice as often but without internal peer checking.

I claim:

1. A method for analyzing industrial plant vibration data wherein the plant includes a computer server with non-transitory computer readable data storage media containing installed vibration analytical software causing the computer server to perform the method, machines subjected to vibration, vibration sensors attached to detect vibration characteristics of the machines and transmitting vibration data indicative of vibration characteristics of the machines to the non-transitory computer readable data storage media on the server, the method comprising:
 a) providing:
  i) five off-site analyst computing stations remote from the industrial plant, the five analyst stations consisting of:
   a) Analyst #1 and Analyst #2 computing stations operated by Category II Analyst #1 and Category II Analyst #2, respectively,
   b) Analyst #3 and Analyst #4 computing stations operated by Category III Analyst #3 and Category III Analyst #4, respectively, and
   c) Analyst #5 computing station operated by Category IV Analyst #5;
  ii) secure communication between the plant server and the off-site analyst computing stations;
  iii) operative access to the vibration analytical software on the plant server from the analyst computing stations; and
  iv) read-only access of the vibration data on the plant server from the analyst computing stations;
 b) conducting initial analyzing procedures, including:
  i) Analyst #5 verifying vibration sensor locations on the machines,
  ii) Analyst #5 collecting digital images of the machines,
  iii) Analyst #5 computing station connecting to the industrial plant server by secure communication means,
  iv) Analyst #5 computing station interactively accessing the vibration analytical software on the server,
  v) Analyst #5 computing station read-only accessing the vibration data on the server,
  vi) Analyst #5 conducting a detailed review and analysis of initially collected vibration data utilizing the analytical software to manipulate the data with preprogrammed algorithms to establish a data baseline from the initially collected vibration data and identify previously unknown component issues,
  vii) Analyst #5 developing and transmitting corrective action recommendations to plant personnel for previously unknown component issues,
  viii) Analyst #5 following-up to confirm implementation of corrective action recommendations and that the corresponding component issue has been resolved, and if not, further following-up with additional investigation, data analysis and corrective action, and
  ix) Analyst #5 documenting results of said detailed review and analysis of initially collected vibration data, previously unknown component issues, corrective actions and results thereof in an initial report and transmitting the initial report to a plant representative;
 c) then, conducting periodic analyzing procedures, including the repeating steps of: analyzing the vibration data and reporting the results thereof by said two Category II Analysts, then analyzing the vibration data and reporting the results thereof by said two Category III Analysts, and then analyzing the vibration data and reporting the results thereof by said one Category IV Analyst, wherein:

i) said analyzing the vibration data and reporting the results thereof by said two Category II Analysts includes:
 a) Analyst #1 and Analyst #2 computing stations, independently, connecting to the industrial plant server by secure communication means,
 b) Analyst #1 and Analyst #2 computing stations, independently, interactively accessing the vibration analytical software on the server,
 c) Analyst #1 and Analyst #2 computing stations, independently, read-only accessing the vibration data on the server,
 d) Analyst #1 and Analyst#2, independently, conducting a detailed review and analysis of new vibration data utilizing the analytical software to manipulate the data with preprogrammed algorithms,
 e) Analyst #1 and Analyst #2, independently, identifying component vibrational characteristics in the vibration data indicative of a change in component structure,
 f) Analyst #1 and Analyst #2, independently, documenting said component vibrational characteristics in Report A and Report B, respectively,
 g) Analyst #1 transmitting Report A to Analyst #2, and Analyst #2 transmitting Report B to Analyst #1,
 h) Analyst #1 and Analyst #2, independently, comparing component vibrational characteristics identified in Reports A and B;
 i) Analyst #1 and Analyst #2, cooperatively, resolving any differences as reasonably possible concerning component vibrational characteristics identified in Reports A and B, and
 j) Analyst #1 and Analyst #2 transmitting Reports A and B, and identification of any unresolved differences between Reports A and B, to Analyst #3 and Analyst #4 via secure communication means, ii) said analyzing the vibration data and reporting the results thereof by said two Category III Analysts includes:
 a) Analyst #3 and Analyst #4 computing stations, independently, connecting to the industrial plant server by secure communication means,
 b) Analyst #3 and Analyst #4 computing stations, independently, interactively accessing the vibration analytical software on the server,
 c) Analyst #3 and Analyst #4 computing stations, independently, read-only accessing the vibration data on the server,
 d) Analyst #3 and Analyst #4, independently, confirming the component vibrational characteristics identified in Reports A and B utilizing the analytical software to manipulate the data with preprogrammed algorithms, and resolving differences in the component vibrational characteristics identified in Reports A and B,
 e) Analyst #3 and Analyst #4, independently, developing corrective action recommendations for plant personnel,
 f) Analyst #3 and Analyst #4, independently, documenting confirmed component vibrational characteristics, corresponding component issues, and corrective action recommendations in Report C and Report D, respectively,
 g) Analyst #3 transmitting Report C to Analyst #4, and Analyst #4 transmitting Report D to Analyst #3,
 h) Analyst #3 and Analyst #4, independently, comparing component vibrational characteristics, corresponding component issues, and corrective action recommendations identified in Reports C and D,
 i) Analyst #3 and Analyst #4, cooperatively, resolving any differences as reasonably possible concerning component vibrational characteristics, corresponding component issues, and corrective action recommendations identified in Reports C and D,
 j) Analyst #3 and Analyst #4 transmitting Reports C and D, and identification of any unresolved differences between Reports C and D, to Analyst #5 via secure communication means, and
 k) Analyst #3 and Analyst #4 transmitting agreed corrective action recommendations to plant personnel; and iii) said analyzing the vibration data and reporting the results thereof by the Category IV Analyst includes:
 a) Analyst #5 computing station connecting to the industrial plant server by secure communication means,
 b) Analyst #5 computing station interactively accessing the vibration analytical software on the server,
 c) Analyst #5 computing station read-only accessing the vibration data on the server,
 d) Analyst #5 confirming the component vibrational characteristics and corresponding component issues identified in Reports C and D utilizing the analytical software to manipulate the data with preprogrammed algorithms, and resolving differences in the component vibrational characteristics corresponding component issues identified in Reports C and D,
 e) Analyst #5 reviewing the corrective action recommendations in Reports C and D, resolving differences in the corrective action recommendations in Reports C and D, in view of said confirming of the component vibrational characteristics and corresponding component issues identified in Reports C and D, and
 f) Analyst #5 developing and transmitting corrective action recommendations to plant personnel for unresolved component issues,
 g) Analyst #5 following-up to confirm implementation of corrective action recommendations and that the corresponding component issue has been resolved, and if not, further following-up with additional investigation, data analysis and corrective action, and
 h) Analyst #5 documenting component issues and corrective actions taken in Report E and transmitting Report E to the plant representative.

2. The method as defined in claim 1 further comprising providing secure communication between the off-site analyst computing stations and multiple industrial plant locations for analyzing the vibration data from each of the industrial plant locations independently of one another by an independent service including said Analysts.

3. A method for analyzing industrial plant vibration data wherein the plant includes a computer server with non-transitory computer readable data storage media containing installed vibration analytical software causing the computer server to perform the method, machines subjected to vibration, vibration sensors attached to detect vibration characteristics of the machines and transmitting vibration data indicative of vibration characteristics of the machines to the non-transitory computer readable data storage media on the server, the method comprising:

a) providing:
  i) three off-site analyst computing stations remote from the industrial plant, the three analyst stations consisting of:
    a) Analyst #1 computing station operated by Category II Analyst #1,
    b) Analyst #2 computing station operated by Category III Analyst #2, and
    c) Analyst #3 computing station operated by Category IV Analyst #3;
  ii) secure communication between the plant server and the off-site analyst computing stations, and
  iii) read-only access of the vibration data on the plant server from the analyst computing stations;
b) conducting initial analyzing procedures, including:
  i) Analyst #3 verifying vibration sensor locations on the machines,
  ii) Analyst #3 collecting digital images of the machines,
  iii) Analyst #3 computing station connecting to the industrial plant server by secure communication means,
  iv) Analyst #3 computing station read-only accessing the vibration data on the server,
  v) Analyst #3 conducting a detailed review and analysis of initially collected vibration data utilizing vibration analytical software to manipulate the data with preprogrammed algorithms to establish a data baseline from the initially collected vibration data and identify previously unknown component issues,
  vi) Analyst #3 developing and transmitting corrective action recommendations to plant personnel for previously unknown component issues,
  vii) Analyst #3 following-up to confirm implementation of corrective action recommendations and that the corresponding component issue has been resolved, and if not, further following-up with additional investigation, data analysis and corrective action, and
  viii) Analyst #3 documenting results of said detailed review and analysis of initially collected vibration data, previously unknown component issues, corrective actions and results thereof in an initial report and transmitting the initial report to a plant representative;
c) then, conducting periodic analyzing procedures, including the repeating steps of: analyzing the vibration data and reporting the results thereof by the Category II Analyst, then analyzing the vibration data and reporting the results thereof by the Category III Analyst, and then analyzing the vibration data and reporting the results thereof by the Category IV Analyst, wherein:
  i) said analyzing the vibration data and reporting the results thereof by the Category II Analyst includes:
    a) Analyst #1 computing station connecting to the industrial plant server by secure communication means,
    b) Analyst #1 computing station read-only accessing the vibration data on the server,
    c) Analyst #1 conducting a detailed review and analysis of new vibration data utilizing vibration analytical software to manipulate the data with preprogrammed algorithms,
    d) Analyst #1 identifying component vibrational characteristics in the vibration data indicative of a change in component structure,
    e) Analyst #1 documenting said component vibrational characteristics in Report A, and
    f) Analyst #1 transmitting Report A to Analyst #2 via secure communication means;
  ii) said analyzing the vibration data and reporting the results thereof by the Category III Analyst includes:
    a) Analyst #2 computing station connecting to the industrial plant server by secure communication means,
    b) Analyst #2 computing station read-only accessing the vibration data on the server,
    c) Analyst #2 confirming the component vibrational characteristics identified in Report A utilizing vibration analytical software to manipulate the data with preprogrammed algorithms,
    d) Analyst #2 developing corrective action recommendations for plant personnel,
    e) Analyst #2 documenting confirmed component vibrational characteristics, corresponding component issues, and corrective action recommendations in Report B,
    f) Analyst #2 transmitting Report B to Analyst #3 via secure communication means, and
    g) Analyst #2 transmitting corrective action recommendations to plant personnel; and
  iii) said analyzing the vibration data and reporting the results thereof the Category IV Analyst includes:
    a) Analyst #3 computing station connecting to the industrial plant server by secure communication means,
    b) Analyst #3 computing station interactively accessing the vibration analytical software on the server,
    c) Analyst #3 computing station read-only accessing the vibration data on the server,
    d) Analyst #3 confirming the component vibrational characteristics and corresponding component issues identified in Report B utilizing vibration analytical software to manipulate the data with preprogrammed algorithms, and resolving differences in the component vibrational characteristics corresponding component issues identified in Report B,
    e) Analyst #3 reviewing the corrective action recommendations in Reports B, and
    f) Analyst #3 developing and transmitting corrective action recommendations to plant personnel for unresolved component issues,
    g) Analyst #3 following-up to confirm implementation of corrective action recommendations and that the corresponding component issue has been resolved, and if not, further following-up with additional investigation, data analysis and corrective action, and
    h) Analyst #3 documenting component issues and corrective actions taken in Report C and transmitting Report C to the plant representative.

4. The method as defined in claim 3 further comprising providing secure communication between the off-site analyst computing stations and multiple industrial plant locations for analyzing the vibration data from each of the industrial plant locations independently of one another by an independent service including said Analysts.

* * * * *